(12) United States Patent
Pfleghar

(10) Patent No.: US 6,655,186 B2
(45) Date of Patent: Dec. 2, 2003

(54) MACHINE TOOL

(75) Inventor: Wolfgang Pfleghar, Weingarten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/989,142

(22) Filed: Nov. 21, 2001

(65) Prior Publication Data

US 2002/0092156 A1 Jul. 18, 2002

(51) Int. Cl.$^7$ .................................................. B21J 9/18
(52) U.S. Cl. ...................... 72/447; 72/453.15; 100/231
(58) Field of Search .................. 72/453.15, 453.16, 72/447; 100/231

(56) References Cited

U.S. PATENT DOCUMENTS

| 493,928 | A | * | 3/1893 | Heyde | 72/453.15 |
|---|---|---|---|---|---|
| 2,572,949 | A | * | 10/1951 | Reese | 100/231 |
| 2,573,574 | A | * | 10/1951 | Johansen | 100/231 |
| 2,837,992 | A | * | 6/1958 | Wissman | 100/231 |
| 4,007,679 | A | * | 2/1977 | Edwards | 100/231 |
| 4,677,727 | A | * | 7/1987 | Hochbein | 72/447 |
| 5,425,262 | A | * | 6/1995 | Dubugnon | 72/407 |
| 6,397,654 | B1 | * | 6/2002 | Moeser | 72/447 |

FOREIGN PATENT DOCUMENTS

DE          3225108       *  1/1983

* cited by examiner

Primary Examiner—David Jones
(74) Attorney, Agent, or Firm—Ronald E. Greigg

(57) ABSTRACT

A machine tool for manual actuation is proposed, in which an intermediate rotary bearing, which has a retaining handle, is disposed on the housing that receives the tool and an abutment, and a cantilevered beam which leads to a rotatable retaining device is secured to the intermediate rotary bearing.

20 Claims, 1 Drawing Sheet

MACHINE TOOL

BACKGROUND OF THE INVENTION

1. Field of the Invention

The invention is based on a machine tool of the type having a tool part supported by a housing and having an adjustment part associated therewith, in which a workpiece can be introduced between the tool part and the adjustment part for machining.

2. Description of the Prior Art

In a known machine tool of this generic type disposition, an adapter is disposed on a housing via a coupling and is rotatable about the housing axis; from the adapter, a pivot beam leads to an intermediate rotary bearing, as a result of which the housing can be rotated in its plane formed by its axis of rotation. The intermediate rotary bearing is in turn disposed on a cantilevered beam, which is retained on its other end. The housing that receives the machine tool is thus in intrinsically rotatable as well as pivotable in the plane defined by its axis, and this arbitrary adjustment can be accomplished via a handle disposed on the housing. The connection for the external energy, which can be electrical, pneumatic or hydraulic, is made via the intermediate rotary bearing and the pivot beam to the adapter, and from there into the housing. Thus in this energy supply system, at least two rotary bearings have to be overcome, which naturally leads to sealing problems. The housing of the machine tool is embodied as tongs, and in manipulation, the workpiece is thrust between the tool part and the abutment part for machining; the flexibility lent by the rotary bearings to the handling device defined by the cantilevered beam, the intermediate rotary bearing, the pivot beam and the coupling and the adapter is meant to facilitate delivering the workpiece to the tool or the tool to the workpiece.

As is known from another handling device (German Published, Nonexamined Patent Application DE-OS 32 25 108), a machine tool of this kind is often suspended from a crane or the like to gain greater freedom of motion; the rotation of the machine tool about its own axis is much less decisive than rotation about an axis that passes through its center of gravity. Despite the advantage of accommodating the energy supply lines via the pivot beam to the housing and the attendant advantage that the supply lines are spaced apart from the actual machining point, problems still exist in the free delivery of the handling device, whose adjustment must in each case be done from the handle disposed on the housing.

Still another handling device is known (DE-OS 38 40 163) in which, in contrast to the invention, the workpiece is not insertable between the tool part and the abutment part; the external energy is not supplied via lines extending inside the intermediate rotary bearing; the intermediate rotary bearing is not disposed directly on the housing, and thus its axis of rotation extends at a distance from the center of gravity of the housing; and there is no actuation handle on the intermediate rotary bearing. The resultant disadvantages are self-evident.

In still another known handling device (U.S. Pat. No. 4,677,727), decisive characteristics of the present invention are also lacking, since the workpiece cannot be inserted for the sake of being machined between the tool part and the abutment part, and retaining devices that engage the intermediate rotary bearing at the end of a cantilevered beam are provided that have an intermediate rotary bearing connected to the housing. Moreover, the supply of external energy is not accomplished via lines extending inside the intermediate rotary bearing, and there is no actuation handle disposed on the intermediate rotary bearing. Hence this known handling device is hard to manipulate and is far less widely usable.

SUMMARY OF THE INVENTION

The machine tool of the invention has the advantage over the prior art of one further degree of freedom in delivering the machine tool by means of the handling device of the invention, and furthermore that this delivery motion is better and more securely controllable as a result of the disposition of the actuation handle on the intermediate rotary bearing.

Because the intermediate rotary bearing is disposed directly on the housing, compared to the generic machine tool, not only is one rotary bearing that has to be overcome by the energy supply omitted, but greater strength with improved quality of guidance of the handling device is also achieved.

In an advantageous feature of the invention, a tool part such as a switch or a mechanically actuated valve, by which the energy supply is controllable, is disposed in the access range of the actuation handle. The connection of the supply line for the external energy can either be accomplished via a handle or provided at some other point of the housing of the intermediate rotary bearing.

In an additional feature of the invention, the retaining device has a bracket or the like for the engagement of the cantilevered cable or the like, whose direction of force is rotatable about the axis of rotation of the retaining device. The machine tool can be delivered extremely flexibly in combination with the handle on the intermediate rotary bearing as well as one additional handle on the housing.

In another advantageous feature of the invention, the intermediate rotary bearing has a pivot pin, secured to the housing, on which a rotatable cuff is supported in a sealed fashion, on which cuff the cantilevered beam or support arm and the actuation handle are secured.

In a further advantageous feature of the invention, the energy supply lines connected to the housing of the intermediate rotary bearing.

In an additional feature of the invention, the abutment part is correspondingly disposed pivotably in the housing from of a working position, determined by a stop, to a free position. Thus in the free position, both the abutment and the tool can be more easily replaced.

In a feature of the invention related to this, a spring engages the abutment part in the direction of the working position, so that the free position can be set only after the spring is overcome.

In another feature of the invention related to this, an actuation handle is provided on the abutment part, with which not only is the housing adjustable but also as needed the abutment part is pivotable relative to the housing. The pivot axis of the abutment part is offset from the work axis of the machine tool, so that in the working function, the abutment part is pressed against its stop.

BRIEF DESCRIPTION OF THE DRAWINGS

Further advantages and advantageous features of the invention can be learned from the description contained herein below, taken in conjunction with the drawings, in which.

DESCRIPTION OF THE PREFERRED EMBODIMENTS

Figure 1:
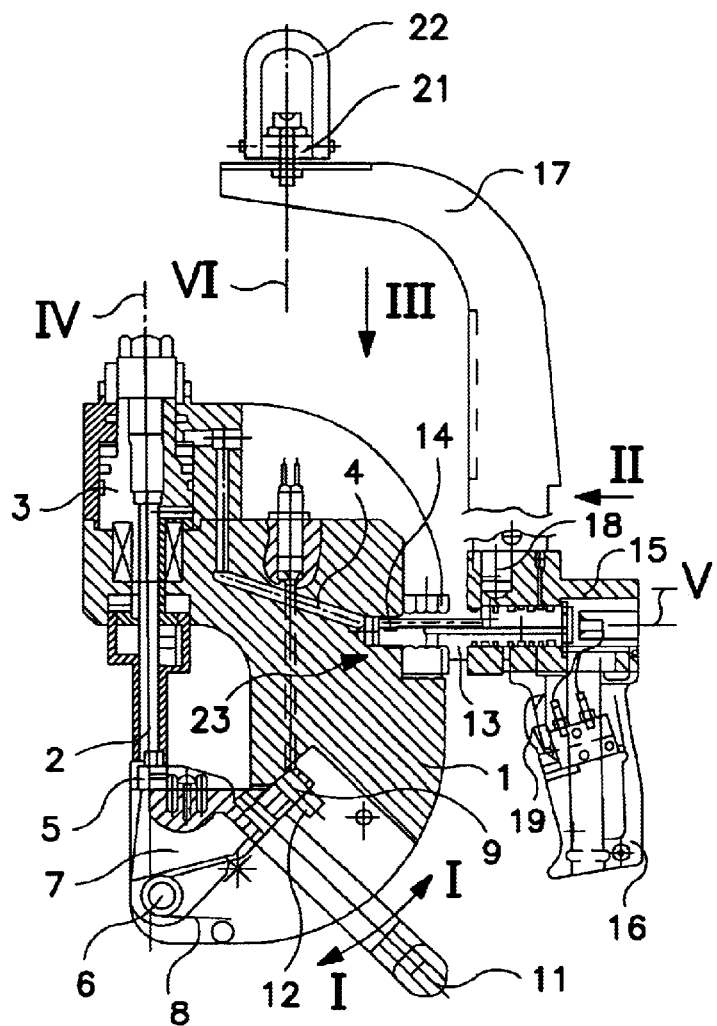
FIG. 1 is a longitudinal section through a machine tool including a handling device.

As shown in the drawing, a pistonlike tool 2 is supported in a tongs-like housing 1 of a machine tool and is driven via a pneumatic piston 3; the compressed air is supplied via a line 4 that extends in the housing 1. An abutment 5 is located facing the free end of the tool 2, and the workpiece to be machined is delivered between the abutment 5 and the tool 2 in a known manner, which is not shown in further detail here. The abutment 5 is disposed on an abutment part 7. The abutment part 7 is pivotally mounted on the housing 1 about an axis 6, and the abutment part is biased by a spring 8 in a counter clockwise direction (as seen in FIG. 1) into a working position shown in FIG. 1, in which the abutment part 7 contacts a stop 9. The abutment part 7 can be pivoted about the pin 6 into a free position spaced from the stop 9 in the direction of the double arrows I with the aid of a handle 11. In this free position, both the abutment 5 and the tool 2 can be replaced. Because the axis 6 is offset from the working axis IV in the direction of the stop 9, during the operation of the machine tool the abutment part 7 is pressed against the stop 9. By means of a stop screw 12, this working position of the abutment part 7 can be adjusted toward the tool 2.

Coaxially with an axis of rotation V that passes approximately through the center of gravity of the housing 1, and perpendicular to the working axis IV of the machine tool, a pivot pin 13 is secured in the housing 1; it receives control lines 14 for delivering energy, and a cuff 15 is disposed rotatably on it, on which cuff a handle 16 on one side and a support arm 17 on the other are secured. The connections 18 for delivering energy are also provided in this cuff 15.

Figure 2:
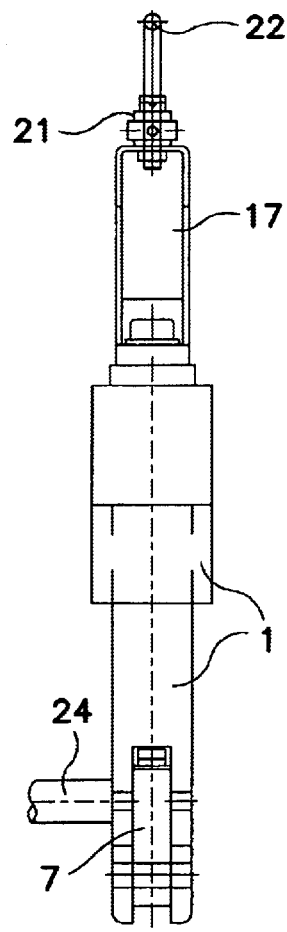
FIG. 2 is a view in the direction of the arrow II in FIG. 1.
Figure 3:
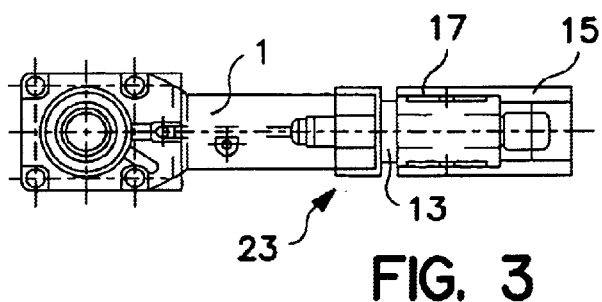
FIG. 3 is a view in the direction of the arrow III in FIG. 1.

An electric switch 19 is disposed on the handle 16, and by means of this switch the electrical energy can be turned on and off. On the free end of the support arm 17, an eyelet 22 is secured via a rotary bearing 21, and the eyelet can be engaged by a supporting cable of a crane or the like; the axis of rotation VI of this rotary bearing 21 extends largely through the center of gravity of the housing I and accordingly intersects the axis of rotation V of the intermediate rotary bearing 23 that comprises the pivot pin 13 and the cuff 15. As shown in FIG. 2, a handle 24 can additionally be provided on the housing 1, to make handling simpler.

All the characteristics shown and described in the description, the ensuing claims and the drawing can be essential to the invention both individually and in arbitrary combination with one another.

The foregoing relates to preferred exemplary embodiments of the invention, it being understood that other variants and embodiments thereof are possible within the spirit and scope of the invention, the latter being defined by the appended claims

I claim:

1. A machine tool, comprising:

a housing (1) having a center of gravity, a tool part (2) supported in said housing (1) and adapted to be driven by an energy source external to said housing, said housing including an abutment part (7) disposed opposite said tool part, whereby a workpiece can be introduced between said tool part and said abutment part, means for suspending said housing from a support structure, said means comprising a first rotary bearing (21) having an axis of rotation (VI) extending substantially through the center of gravity of said housing, said first rotary bearing being connected to a first end of a support arm (17), a second rotary bearing (23) disposed on said housing, said second rotary bearing having an axis of rotation (V) extending substantially through the center of gravity of the housing and disposed at an angle to the axis of rotation of said first rotary bearing, said second rotary bearing including a cuff fixed to a second end of said support arm, a first handle (24) mounted on said housing for adjusting the position of said housing about the axis of rotation of said second rotary bearing, a second handle (16) mounted on said cuff for adjusting the position of said housing about the axis of rotation of said first rotary bearing, and means (14) for delivering energy to said tool part extending inside said second rotary bearing.

2. The machine tool of claim 1, further comprising a switch (19) mounted on said second handle for controlling the delivery of energy to said tool part.

3. The machine tool of claim 2, wherein said means for suspending said housing from a support further comprises a bracket (22) rotatably secured to said support arm by said first rotary bearing.

4. The machine tool of claim 3, wherein the second rotary bearing (23) comprises a pivot pin (13) secured to the housing and the cuff is supported rotatably on said pin, said support arm (17) being secured to one side of said cuff and said second handle (16) being mounted on an opposite side of said cuff.

5. The machine tool of claim 3, wherein the means (14) for delivering energy to said tool part includes a supply line (18) passing through said cuff.

6. The machine tool of claim 4, wherein the means (14) for delivering energy to said tool part includes a supply line (18) passing through said cuff.

7. The machine tool of claim 2, wherein the abutment part (7) is pivotally supported on said housing between a working position, in which the abutment part contacts a stop (9) formed on said housing, and a free position, in which the abutment part is spaced from said stop.

8. The machine tool of claim 3, wherein the abutment part (7) is pivotally supported on said housing between a working position, in which the abutment part contacts a stop (9) formed on said housing, and a free position, in which the abutment part is spaced from said stop.

9. The machine tool of claim 7, further comprising a spring (8) biasing said abutment part (7) in the direction of said working position.

10. The machine tool of claim 1, wherein said means for suspending said housing from a support further comprises a bracket (22) rotatably secured to said support arm by said first rotary bearing.

11. The machine tool of claim 1, wherein the second rotary bearing (23) comprises a pivot pin (13) secured to the housing and the cuff is supported rotatably on said pin, said support arm (17) being secured to one side of said cuff and said second handle (16) being mounted on an opposite side of said cuff.

12. The machine tool of claim 11, wherein the means (14) for delivering energy to said tool part includes a supply line (18) passing through said cuff.

13. The machine tool of claim 11, further comprising a third handle (11) secured to said abutment part (7).

14. The machine tool of claim 1, wherein the means (14) for delivering energy to said tool part includes a supply line (18) passing through said cuff.

15. The machine tool of claim 14, wherein the abutment part (7) is pivotally supported on said housing between a working position, in which the abutment part contacts a stop (9) formed on said housing, and a free position, in which the abutment part is spaced from said stop.

16. The machine tool of claim 15, further comprising a spring (8) biasing said abutment part (7) in the direction of said working position.

17. The machine tool of claim 1, wherein the abutment part (7) is pivotally supported on said housing between a working position, in which the abutment part contacts a stop (9) formed on said housing, and a free position, in which the abutment part is spaced from said stop.

18. The machine tool of claim 17, further comprising a spring (8) biasing said abutment part (7) in the direction of said working position.

19. The machine tool of claim 17, further comprising a third handle (11) secured to said abutment part (7).

20. The machine tool of claim 1, further comprising a third handle (11) secured to said abutment part (7).

* * * * *

UNITED STATES PATENT AND TRADEMARK OFFICE
CERTIFICATE OF CORRECTION

PATENT NO. : 6,655,186 B2
DATED : December 2, 2003
INVENTOR(S) : Wolfgang Pfleghar It is certified that error appears in the above-identified patent and that said Letters Patent is hereby corrected as shown below:

<u>Title page,</u>
Item [73], Assignee, should read as follows: -- (73) Assignee: TOX Pressotechnik GmbH & Co. KG, Weingarten (DE) --.

Signed and Sealed this

Eighteenth Day of May, 2004

JON W. DUDAS
*Acting Director of the United States Patent and Trademark Office*